United States Patent [19]

Kanerva et al.

[11] 4,195,656
[45] Apr. 1, 1980

[54] ORIFICE DEVICE WITH SAFETY SHUT-OFF FOR PRESSURE REGULATORS

[75] Inventors: Robert A. Kanerva, Burlington; James E. Bailey, Milton, both of Canada

[73] Assignee: The Singer Company, New York, N.Y.

[21] Appl. No.: 922,629

[22] Filed: Jul. 7, 1978

[51] Int. Cl.² .................................................. F16K 17/00
[52] U.S. Cl. ....................................... 137/458; 137/537; 137/540
[58] Field of Search ............... 137/458, 537, 540, 456; 251/DIG. 1

[56] References Cited

U.S. PATENT DOCUMENTS

| | | | |
|---|---|---|---|
| 347,840 | 8/1886 | Stubbe | 137/458 |
| 2,189,129 | 2/1940 | Bridwell | 137/537 X |
| 2,788,798 | 4/1957 | Mueller | 137/456 |
| 2,832,641 | 4/1958 | Korda | 137/537 X |
| 2,896,661 | 7/1959 | Becker | 137/537 X |
| 3,756,273 | 9/1973 | Hengesbach | 137/540 |
| 3,971,410 | 7/1976 | St. Clair | 137/458 X |
| 4,059,017 | 11/1977 | Settlemyer | 137/540 X |
| 4,067,355 | 1/1978 | St. Clair | 137/456 X |

*Primary Examiner*—Harold W. Weakley
*Attorney, Agent, or Firm*—Charles R. Lewis

[57] ABSTRACT

A pressure regulator of the spring loaded diaphragm type having a chamber on one side of the diaphragm and provided with an inlet and an outlet separated by a transverse wall into which an orifice device is mounted for stopping the flow of gas through the regulator during excess flow or low outlet pressure conditions.

During normal operation the valve element actuated by the diaphragm will co-act with the valve seat of the orifice device to regulate the thruput flow, while engaging a valve stem of the orifice device to hold the same open. The orifice device has a body through which the valve stem extends. A helical spring interconnects the body and the valve stem by being separately threaded to each component whereby the orifice device is normally biased in a closed position.

6 Claims, 8 Drawing Figures

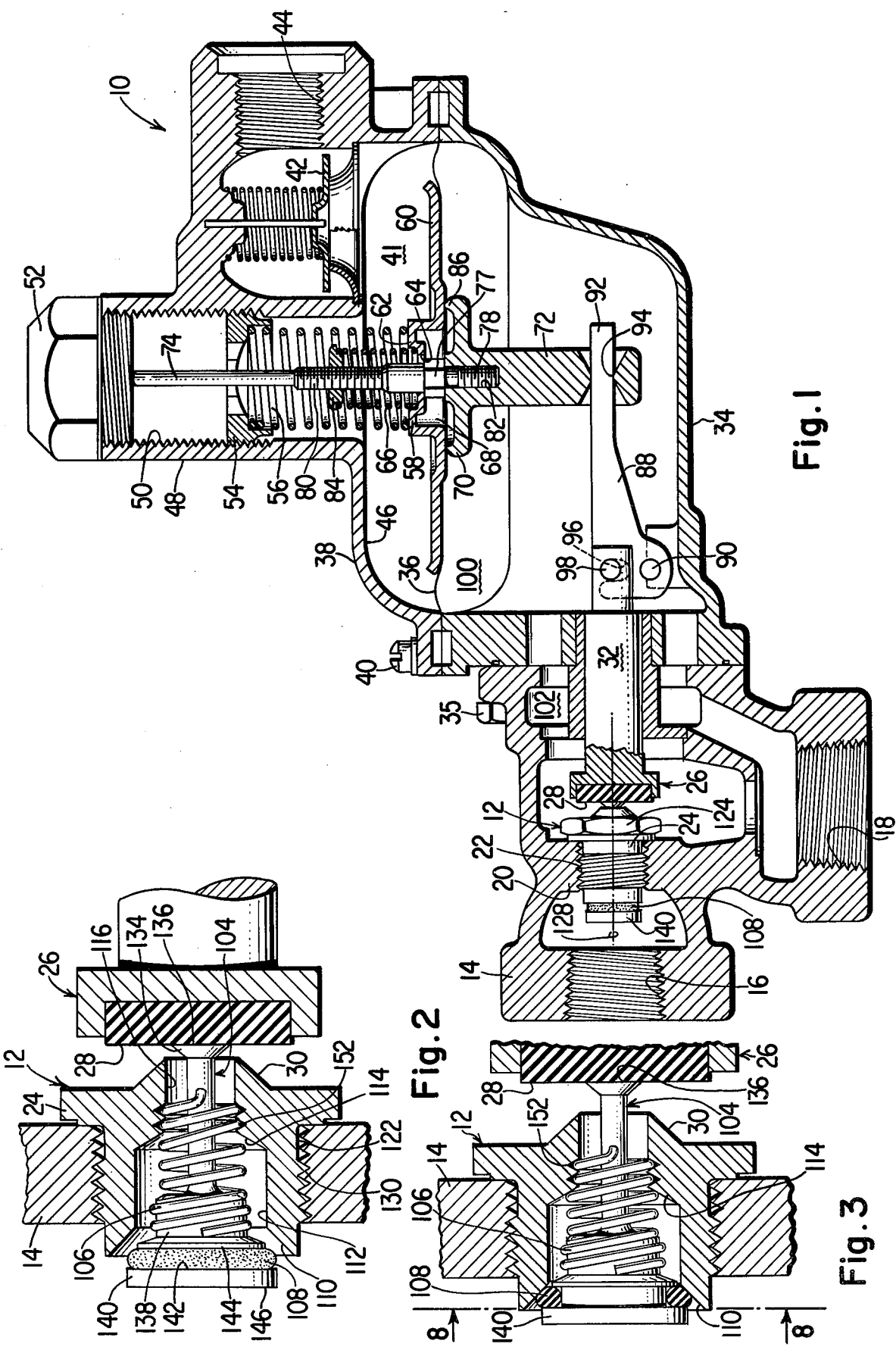

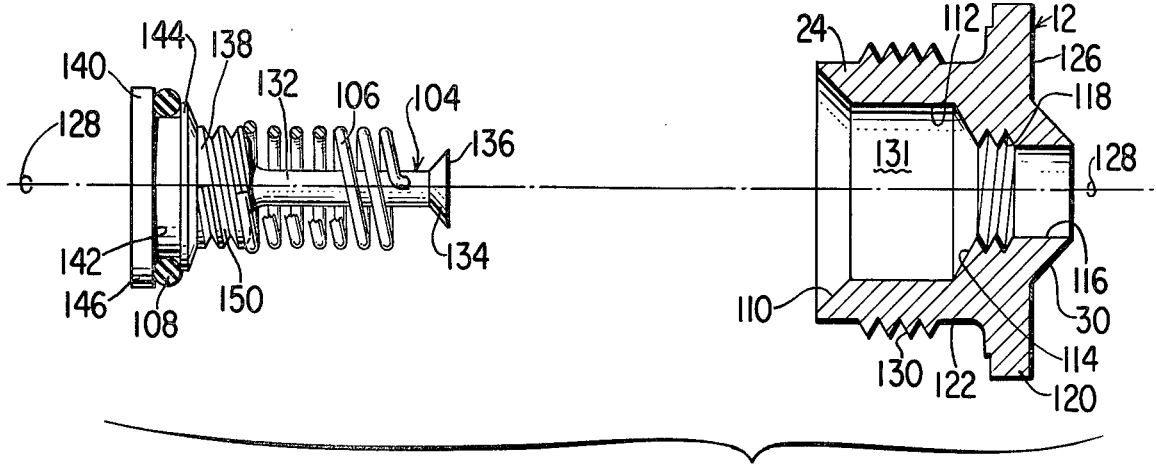
Fig. 4
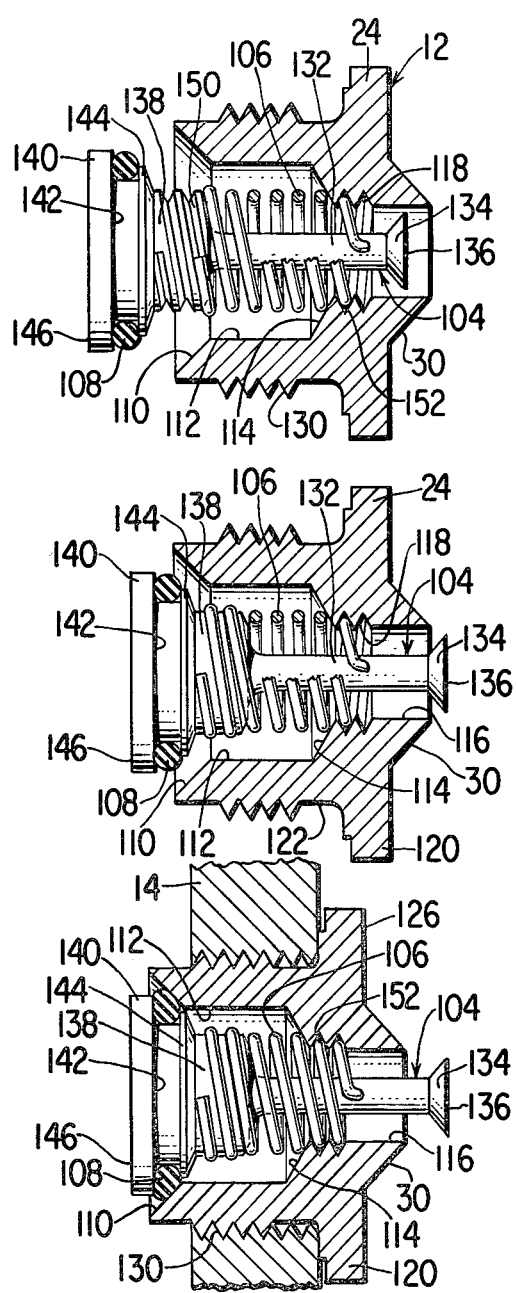
Fig. 5
Fig. 6
Fig. 7
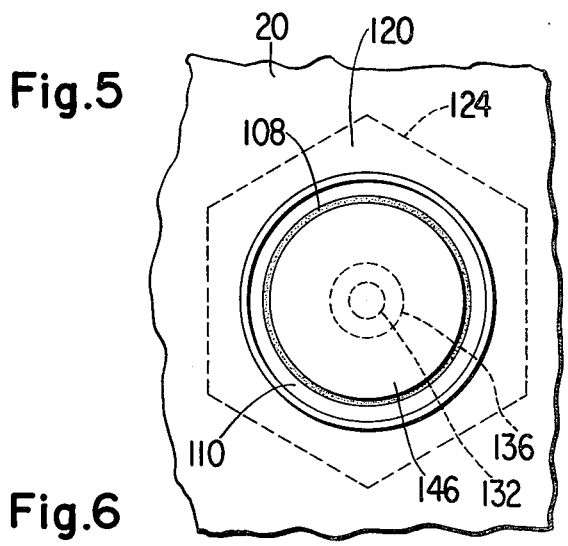
Fig. 8

ORIFICE DEVICE WITH SAFETY SHUT-OFF FOR PRESSURE REGULATORS

BACKGROUND OF THE INVENTION

Heretofore prior art pressure regulators having safety shut-off devices had complex structures and operations, and they were costly to assemble and maintain. Also, the springs used in the prior art orifice devices were only used for purposes of biasing or guiding the device.

SUMMARY OF THE INVENTION

It is an object of the present invention to provide an improved orifice device having a safety shut-off which overcomes the prior art disadvantages; which is simple, economical and reliable; which uses a spring to interconnect the component parts of the orifice device; which includes a safe shut-off valve in the orifice device; which has an orifice valve normally held open by a diaphrgam actuated valve element; which has a diaphragm valve element co-acting with the orifice device to control the thruput flow of the pressure regulator; and which orifice device has a selfcentering valve.

Other objects and advantages will be apparent from the following description of one embodiment of the invention and the novel features will be particularly pointed out hereinafter in the claims.

BRIEF DESCRIPTION OF THE DRAWINGS

This invention is illustrated in the accompanying drawings in which:

FIG. 1 is an elevational view, partly in section, of a pressure regulator embodying an orifice device of the present invention.

FIG. 2 is an enlarged elevational view, partly in section, of the valve element co-acting with the orifice device of the present invention to regulate the thruput flow of the pressure regulator.

FIG. 3 is an enlarged elevational view, partly in section, of the orifice device in the shut-off, locked down position.

FIGS. 4 through 7 are diagrammatic representations of the steps of assembly of the orifice device wherein: FIG. 4 shows the body remote from the valve stem to which the "O"ring valve element is mounted and the helical spring partially connected thereto; FIG. 5 shows the spring partially threaded to the body; FIG. 7 shows the spring rotated fully onto the valve stem; and FIG. 7 shows the orifice device fully assembled and mounted within the transverse wall of the pressure regulator.

FIG. 8 is a front elevational view taken along line 8—8 of FIG. 3.

DESCRIPTION OF THE INVENTION

In the illustrated embodiment of the invention, a pressure regulator, generally designated 10 is shown in FIG. 1, and includes an orifice device 12 mounted in a housing 14 for purposes more fully described hereinafter. The housing 14 has an inlet 16 and an outlet 18 separated by a transverse wall 20 with a tapped aperture 22 to which a body 24 of the orifice device 12 is threadedly connected to shut-off the thruput flow of gas in the pressure regulator 10 from the inlet 16 to the outlet 18 as more fully decribed hereinafter.

A valve element 26 illustrated in FIGS. 1, 2 and 3 includes an annular non-metallic seat disc 28 which will co-act with an annular conical valve seat 30 of the orifice device 12 to control the thruput flow of the pressure regulator 10. The valve element 26 is formed on the leftward side as viewed in FIGS. 1 and 2 of a valve stem 32 slidably mounted in a body 34 sealingly affixed to the housing 14 as by bolts 35, one of which is shown in FIG. 1.

The outer periphery of a flexible diaphragm 36 illustrated in FIG. 1 is clamped between mating surfaces of the body 34 and a bonnet 38 as by screws 40, one of which is shown in FIG. 1. A vent chamber 41 is formed in the bonnett 38, above the diaphragm 36. A check valve 42 is disposed in the vent chamber 41 and connected on one side of the bonnett 38 inwardly of a vent connection 44 normally to prevent return flow from the vent connection 44 from entering the vent chamber 41, but which valve 42 will open under very low pressure differential to vent the chamber 41 through the vent connection 44.

The bonnett 38 illustrated in FIG. 1 has a flat portion with an under-surface 46 which extends into a central upwardly projecting tubular portion 48 provided with an internal thread 50 and closed by a threaded cap or seal plug 52. An adjusting nut 54 engages the thread 50 and contacts the upper end of a load spring 56. The load spring 56 is a coil compression spring and the lower end thereof sits upon a raised portion 58 formed centrally of a diaphragm plate 60 disposed on one side of the diaphragm 36 so as to have the spring force bear upon the diaphragm. The raised portion 58 has a integrally formed annular spring cup 62. The cup 62 has apertures 64 therein to serve as relief passages. A relief valve spring 66 is disposed inside of the load spring 56 and has its lower end nested on the bottom wall of the cup 62.

A rim 86 is formed on the relief valve head 70 sealingly to engage the undersurface of the flexible diaphragm 36. Whenever the diaphragm 36 moves away from the valve head, because of excessive outlet pressure or the like, gas will flow through the opening between the rim 86 and the underside of the diaphragm 36, past the aperture 64 and into the vent chamber 41 from which it may exit through the check valve 42 to the vent connection 44.

The adjusting nut 54 may be turned by means of a tool, not shown, inserted into the tubular portion 48 of the bonnett 38, in the absence of cap 52. Another tool, not shown, may be inserted through the central opening in the nut 54 for adjusting the nut 84 on the extension rod 74. This will permit separate adjustment of the forces of each of the springs 56 and 66. The flexible diaphragm 36 is annular in shape and is provided with a central opening 68 about which is disposed a relief valve head 70 formed at the upper end of a diaphragm stem 72 and disposed at the underside of the diaphragm 36.

The diaphragm 36 is normally clamped between the diaphragm stem 72 and the diaphragm plate 60, with the interconnection therebetween being held by the force of the springs 56 and 66. An extension rod 74 has an integral nut 77 formed thereon, and threaded sections both below and above, as at the lower end 78 and the intermediate section 80. The lower end 78 is threadedly received in a tapped hole 82 of the diaphragm stem 72. An adjusting nut 84 is threaded upon the intermediate threaded section 80 and engages the upper end of the relief valve spring 66.

A lever 88 illustrated in FIG. 1 is pivotably supported on the body 34 at 90, and has an extension portion 92 projecting through a fulcrummed slot 94 formed adjacent the bottom end of the diaphragm stem 72. A substantially vertical slot 96 is formed at the end of the lever 88 opposite the extension 92 and in superposition to the pivot 90 to slidingly receive a pin 98 which is affixed to and extends outwardly of the rightward end of the valve stem 32 as viewed in FIG. 1 so as to interconnect the lever 88 with the valve stem 32 whereby any pivotal movement of the lever 88 is translated into corresponding reciprocating movement by the stem 32.

A chamber 100 is formed within the body 34 below the flexible diaphragm 36 in communication with the outlet 18 through passages 102 within the diaphrgam 36 will be loaded on its underside by the outlet pressure.

The orifice device 12 illustrated in FIGS. 1, 2 and 3 includes a body 24, a valve stem 104 extending therethrough and a helical spring 106 which interconnects the body 24 and the valve stem 104. In assembled position the orifice device 12 is biased closed as illustrated in FIG. 3 by the force of the spring 106 urging the valve stem 104 in the rightward direction to cause an "O" ring valve element 108 to abut a conical valve seat 110 formed on the interior leftward end of the body 24. The valve seat 110 slopes inwardly and rightwardly as shown in FIGS. 2, 3 and 4 into a counterbore 112 which has a neckeddown section 114 that terminates in a reduced diameter portion 116 having the end adjacent the necked-down section 114 threaded as at 118 to receive at least two coils or turns of the spring 106. An annular flange 120 is formed radially outwardly of a sleeve 122 at the right end of the body 24 on the opposite the threads 118. The outer periphery 124 of the flange 120 is hexagonal as shown in FIG. 1 to facilitate installation of the orifice device 12. The rightward face 126 has the valve seat 30 projecting outwardly of the flange 120 and sloped downwardly toward the axis 128 illustrated in FIG. 4. The sleeve 122 has a threaded section 130 formed intermediate its length so as to premit the body to be connected into the threaded aperture 22 with the flange 120 abutting the transverse wall 20 as shown in FIGS. 1, 2, 3 and 7. An axial passage 131 is formed through the body 24 and includes the various successive openings 110, 112, 114 and 116.

The valve stem 104 illustrated in FIGS. 2, 3 and 4 has a shank 132 which flares slightly at the rightward end to form an enlarged head 134 which terminates in a flat face 136 having a smaller diameter than the diameter of the reduced portion 116 as shown most clearly in FIG. 5. The leftward end of the shank 132 terminates in a cylindrical section 138 which terminates in a enlarged head 140 at the left most end of the stem 104. An annular axially extending groove 142 is formed on the head 140 to receive an "O" ring 108. The head 140 has a reduced diameter section 144 on the right side of the groove 142 as viewed in FIG. 4 so that "O" ring 108 will protrude beyond the section 144 to mate with the inwardly sloping conical surface valve seat 110. The diameter of the spring 106 is matched to the diameter of the threads 118 on the portion 116, and threads 150 formed on the cylindrical section 138 which threads 150 have an axial length sufficient to receive two coils or turns of the spring 106. The spring 106 is sized so that upon being rotated onto the threads 150 of the cylinder 138 the inner diameter thereof will match or be slightly smaller so as to cause the spring 106 to slightly expand, while the threads 118 will receive the outer diameter of the coils of the spring 106 to permit easy turning thereon by being matched to the spring size or being slightly smaller so as to cause a slight depression of the spring 106 coils upon connection therein.

In the preferred embodiment, the spring 106 as shown in FIGS. 4 and 5 will be fully threaded to the cylindrical section 138 of the valve stem 104 before placing the valve stem 104 within the body 24. TThe "O" ring is seated by finger pressure against surface 110 and a special tool (not shown) is inserted through the opening 116. The tang of spring 106 is engaged and the spring 106 is started into threads, pressure is removed and the spring 106 is tightened into the threads 118 of the reduced diameter portion 116 to complete the assembly of the valve stem 104 within the body 24 as shown in FIG. 7 whereby the orifice device 12 will be in its normally closed position with the spring 106 slightly stretched to create a compressive force to urge the "O" ring 108 against the valve seat 110 as is depicted in FIGS. 3 and 7 to close the axial passage 131. If desired, the coils of the spring 106, can be secured within the threads 118 and 150 by a suitable adhesive designated generally as 152, and depicted in FIGS. 2, 3 and 7.

The diaphragm 36 and the spring 56 constitute control means responsive to the pressure in the chamber 100. In operation the diaphragm 36 shown in FIG. 1 moves up or down until the outlet pressure in the chamber 100 on the underside of the diaphragm 36 reaches equilibrium with the spring pressure on the upper side of the diaphragm. During normal operation of the pressure regulator 10 the thruput flow of gas through the orifice device 12 is controlled responsive to the movement of the diaphragm 36. As the outlet pressure falls, the diaphragm 36 moves downwardly, moving the valve element 26 away from the orifice device 12 by a limited pre-set amount as illustrated in FIGS. 1 and 2. Within the limited pre-set amount of say up to ¼" this will permit larger amounts of gas through the orifice device 12 so as to approach maintaining or prevent further decrease of the outlet pressure. Of course, increase of the outlet pressure in chamber 100 will result in the valve element 26 moving leftwardly as viewed in FIGS. 1 and 2 so as to decrease the flow through the orifice device 12 until the valve seat disc 28 engages the valve seat 30 to completely shut off the flow until such time as the outlet pressure were to be lessened to cause the valve element to again shift rightwardly away from engagement with the valve seat 30 thus re-opening the orifice device 12 and resume the pressure controlled thruput flow in the pressure regulator 10.

During normal operation of the pressure regulator 10 the orifice device 12 will have the end face 136 of the valve stem 104 pushed leftwardly by continued engagement with the seat disc 28 of the valve element 26 so as positively to hold the "O" ring 108 away from the conical valve seat 110 though the distance may vary within a predetermined range so long as the valve element 26 remains operative the passage 131 will remain open from the inlet side of the orifice device 12. Thus, the only valve operative will be that of the valve element 26 and the co-acting valve seat 30 located on the outlet side of the orifice device 12.

However, the orifice device 12 is designed among other things to shut off the flow responsive to under pressure on the outlet side or excess flow through the orifice device. In either event, as illustrated in FIG. 3, the "O" ring valve element 108 will engage the conical valve seat 110 to shut off the flow and produce a lock down position aided by the force of the inlet pressure acting on the front face 146 of the valve stem 104. This will prevent the pressure regulator 10 from functioning until it is manually reset. In other words, once the axial movement of the valve element 26 is sufficiently rightward to shift it as shown in FIG. 3 the orifice device 12 shuts off and becomes locked closed. Thereafter, the pressure regulator 10 can be reset by removal of the cap 52, and raising of the extension rod 74 to force the valve element 26 against the valve stem 104 and cause it to move leftwardly as viewed in FIGS. 1 and 2 and disengage the "O" ring 108 from the valve seat 110 and reopen the inlet side of the orifice device 12, thus permitting it to once again come under the influence of the diaphragm 36. This will re-establish normal operation of the pressure regulator 10.

It will be understood that various changes in the details, materials, arrangements of parts and operating conditions which have been herein described and illustrated in order to explain the nature of the invention may be made by those skilled in the art within the principles and scope of the invention.

We claim:

1. A pressure regulator operative in responsive to inlet pressure and outlet pressure comprising;
   a. a housing having an inlet, an outlet, a transverse wall therebetween, and a chamber formed on the outlet side,
   b. an orifice device connected in the transverse wall and including a shut-off valve on the inlet side and a valve seat on the outlet side,
   c. a flexible diaphragm having one side in communication with the outlet connected in the chamber,
   d. a diaphragm valve element operatively actuated by the diaphragm to be shifted a predetermined distance toward and away from the valve seat responsive to the pressure in the chamber, and
   e. the valve element, during normal operation of the pressure regulator, to engage and to hold open the shut-off valve whereby upon under pressure in the outlet chamber or excessive flow through the orifice device causes the shutoff valve to be actuated to close the orifice device and to prevent any flow therethrough,
   the orifice device including a body having a passage therethrough and the valve seat formed on the outlet side thereof,
   the shut-off valve including the body having a valve seat formed on the inlet side thereof, a valve stem located within said passage and having a valve head coacting with the valve seat and a tension spring located within said passage and surrounding a portion of the length of the stem to interconnect the valve stem to the body, and the valve stem extending from the passage in the body to be engaged by the diaphragm valve element whereby the shut-off valve is held open during normal operation of the pressure regulator, and will be biased closed by the force of the spring and locked down by the force exerted by the inlet pressure to prevent any flow through the orifice device upon under pressure in the outlet chamber or excessive flow through the orifice.
   said passage being counterbored with the smaller diameter portion adjacent the diaphram valve seat
   said spring is a coil spring having one end connected to the valve stem adjacent said valve head and the other end secured to the small diameter portion whereby the spring will normally be placed in tension by the force of the diaphram valve element shifting the valve stem to hold the shut-off valve open.

2. The combination claimed in claim 1 wherein: the smaller diameter portion of said passage is threaded to receive at least two turns of one end of the spring connecting member.

3. The combination claimed in claim 2 wherein:
   a. the valve head having an annular groove and an intermediate section of reduced diameter being threaded to receive at least two turns of the coil spring,
   b. an "O" ring fitted within the annular groove and adapted to form a seal with the valve seat of the shut-off valve, and
   c. the spring to be rotatably received upon the threads of the intermediate section whereby when the valve stem is not being held by the diaphragm valve element the spring will bias the shut-off valve closed.

4. A pressure regulator operative responsive to inlet pressure and outlet pressure comprising;
   a. a housing having an inlet, an outlet, a transverse wall therebetween, and a chamber formed on the outlet side,
   b. an orifice device connected in the transverse wall, and including a body having a passage therethrough and a first valve seat formed on the outlet side thereof,
   c. a flexible diaphragm having one side in communication with the outlet connected in the chamber,
   d. a valve element operatively actuated by the diaphragm to be shifted a predetermined distance toward or away from the first valve seat responsive to the pressure in the chamber,
   e. a valve stem extending through the passage of the body in the direction of the first valve seat,
   f. the body having a second valve seat formed on the inlet side thereof,
   g. a tension spring disposed in the passage to interconnect the valve stem and the body, the spring surrounding a portion of the length of the valve stem and having one end connected to the body and the other end connected to the valve stem,
   h. the valve stem having an enlarged head defining a valve member continuously biased by the spring toward the second valve seat whereby the valve member is adapted to close the passage and shut the flow from the inlet to the outlet, and
   i. a post formed on the diaphragm valve element to engage the valve stem and during normal operation thereof continuously to push the valve stem in the direction away from the second valve seat whereby upon under pressure in the outlet chamber or excessive flow the valve stem will shift to engage the valve member and the second valve seat to shut-off the flow through the orifice device.
   j. the passage of the body is counterbored with the smaller diameter section partially threaded and disposed adjacent the diaphragm valve seat, and the spring is a coil spring rotatably threaded upon the threads of the reduced diameter section of the passage.

5. The combination claimed in claim 4 wherein
   a. the body has a sleeve with a flange on the outlet side adjacent the diaphram valve seat and a threaded periphery, and b. a threaded aperture formed in the transverse wall to receive the threaded sleeve of the orifice device.

6. The combination claimed in claim 5 wherein:

a. the valve head has an intermediate section of reduced diameter which is threaded to rotatably receive at least two turns of the coils of the other end of the coil spring whereby the valve stem will be yieldably connected to the body with the spring in tension to continuously urge the valve head in the direction of the second valve seat, and an annular groove formed on the valve head, b. an "O" ring disposed in the annular groove to define a shut-off valve element engagable with the second valve seat to shut off the passage through the orifice device.

* * * * *